Figure 1:
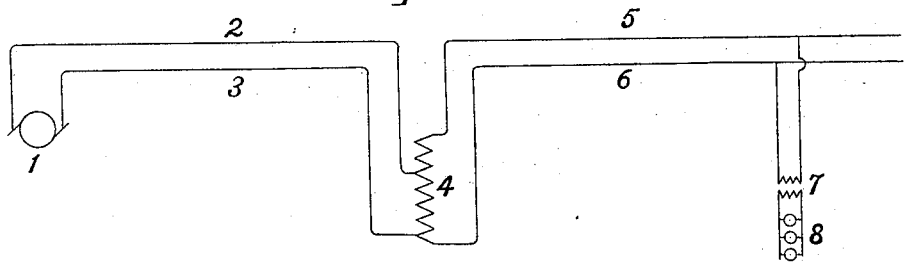

(No Model.)

C. F. SCOTT.
SYSTEM OF ELECTRICAL DISTRIBUTION.

No. 593,244. Patented Nov. 9, 1897.

WITNESSES:
Ethan I. Dodds
Hubert C. Tener

INVENTOR
Charles F. Scott
BY
Terry MacKaye & Carr
ATTORNEYS.

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

SYSTEM OF ELECTRICAL DISTRIBUTION.

SPECIFICATION forming part of Letters Patent No. 593,244, dated November 9, 1897.

Application filed January 12, 1895. Serial No. 534,640. (No model.)

*To all whom it may concern:*

Be it known that I, CHARLES F. SCOTT, a citizen of the United States, residing in Pittsburg, in the county of Allegheny, State of Pennsylvania, have invented a new and useful Improvement in Systems of Electrical Distribution, (Case No. 623,) of which the following is a specification.

My invention relates to the transmission of electrical energy, and more particularly to high-potential systems of alternating-current distribution in which a certain limiting alternating electromotive force cannot be exceeded; and it has for its object to provide a method and a means whereby the maximum electromotive force at the generator-station is more nearly approximated at the distant points where the translating devices are located than is possible under ordinary conditions.

My improvements are particularly adapted to very long lines in which the cost of copper for the conductors is an important factor in the installation and maintenance of the system. In a long-distance system of transmission, such as is contemplated in my invention, it is desirable to raise the electromotive force at the generator-station to as high a limit as will be warranted by the insulation employed; but under such conditions the loss in the conductors by reason of the drop in the line will be considerable. If, for example, the loss in the conductors of such system be forty per cent., then the electromotive force at the end of the line would be sixty per cent. of that at the generator-station. There being a gradual drop in the line, the electromotive force will be at all points less than that at the generating-station and therefore less than the allowable limit. It will thus be seen that if the energy conveyed on the second half of the line were maintained at or near the limit of the allowable electromotive force the current to be carried would be less and the size of conductor required for the same loss would also be less. In view of these considerations I propose to place transformers for increasing the electromotive force to the safe limit at any convenient point or points in the line. For example, if the limiting electromotive force be twenty thousand volts and there be a loss of forty per cent. in the line the electromotive force at the end of the line under the ordinary conditions would be twelve thousand volts and the same current would be carried throughout the line. Assuming such to be the conditions, if a properly proportioned transformer for raising the electromotive force be introduced at the middle point of the line where the electromotive force would normally be reduced twenty per cent.—that is, to fifteen thousand volts—the electromotive force may be raised to the original limit of twenty thousand volts. The current required for delivering the same power from this transformer to the second half of the line is eighty per cent. of the current in the first half of the line, and is therefore twenty per cent. less than is required in the second half of the line under ordinary working. The same loss in the second half of the line will be obtained with a wire sixty per cent. of the weight of the one which would have been required under ordinary methods of working. The saving in copper in the whole circuit therefore amounts to twenty per cent. It is evident that if the same size of copper were retained the loss in the line would be decreased. Under the conditions described the electromotive force at the end of the line will be sixteen thousand volts instead of twelve thousand, the electromotive force which would be available without the use of the transformer.

Figure 2:
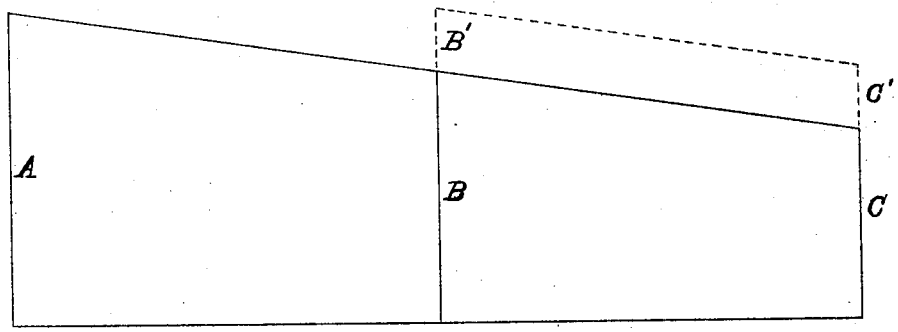

In the accompanying drawings, Figure 1 is a diagram showing a transmission system embodying my invention, and Fig. 2 is a diagram illustrating the changes in electromotive force throughout the line.

Referring particularly to Fig. 1 of the drawings, 1 is an alternating-current generator, and 2 and 3 and 5 and 6 the transmission-circuit. 4 is a step-up converter located at an intermediate point in the line. 7 represents a step-down converter, and 8 translating devices of any desired character.

For the purpose of raising the electromotive force in the line I prefer to employ an auto-converter, as shown in the drawings, on account of the fact that such converters are considerably less expensive than the ordinary two-coil transformers; but any desired form may be employed as within the scope of my invention. I have also shown the converter as located at substantially the middle point of the line; but it is obvious that any desired number of such converters may be employed, and that they may be located at any desired distance from each other.

Referring now to Fig. 2, the vertical line at A represents the electromotive force at the generator, which in the example above referred to would be twenty thousand volts, and the vertical line B indicates the electromotive force at the middle point of the line, or sixteen thousand volts. The dotted line B' indicates the additional electromotive force due to the transformer inserted in the line at this point, the two lines B B' indicating an electromotive force of twenty thousand volts. The vertical line C indicates twelve thousand volts, the electromotive force when no transformer is employed, and C C' sixteen thousand volts, or the resulting electromotive force when that at the middle point of the line is raised to the specified limit.

I claim as my invention—

1. A system of electrical distribution comprising an alternating-current generator, its circuit, and translating devices fed thereby, and a step-up transformer interposed in the circuit approximately midway between the generator and translating devices for raising the electromotive force to substantially the maximum limit allowable at the generator, substantially as described.

2. A system of electrical distribution comprising a source of high-tension electrical energy, a transmission-circuit in two or more sections, a step-up transformer between each two adjacent sections for raising the electromotive force to the maximum limit allowable at the generator, and translating devices at the end of the circuit, substantially as described.

In testimony whereof I have hereunto subscribed my name this 4th day of January, A. D. 1895.

CHAS. F. SCOTT.

Witnesses:
CHARLES IRA YOUNG,
JAMES WM. SMITH.